Patented Dec. 11, 1928.

1,694,921

UNITED STATES PATENT OFFICE.

HERMAN H. KAUFMANN AND AUGUST H. KAUFMANN, OF CASCADE, WISCONSIN.

CHEESE FORMULA.

No Drawing.     Application filed September 27, 1926.   Serial No. 138,118.

This invention relates to a process of making cheese, and is particularly directed to a process of making curd cheese.

An object of this invention is to provide a method of making curd cheese which does not produce any waste, but which utilizes all of the curds of the milk in a novel and effective manner.

Further objects are to provide a method of making curd cheese which is rapid and which may be carried out by the usual type of machinery in a simple and effective manner.

Further objects are to provide a novel method of making cheese which permits the placing of the cheese upon the market at an earlier period than has heretofore been possible, and which also permits the pouring of the cheese into foil-lined containers, so that there is no waste due to the formation of a rind or other part of the cheese which is unserviceable or useless.

As an illustration of this invention the following steps of the process are given:

100-pounds of standard curd are utilized. This curd may be produced by any suitable method as, for example, by adding rennet or pepsin to milk and, if desired, coloring matter may also be added.

This 100-pound mass of curd is then ground until it is in a granular or fluffy condition. Then approximately three pounds of sodium phosphate or other harmless emulsifying agent mixed with about 25-pounds of water or other suitable liquid is added. This emulsifying agent with the water is thoroughly mixed with the ground curd, and it is possible to start heating at this time, but it is preferable to let the mixture stand for about 90 minutes before heating, as this helps in emulsifying the mass. Thereafter, the mixture is put into a kettle or mechanical heating apparatus, preferably provided with paddles or other type of stirrers, and is heated to about 160° F., or until it is thoroughly melted. Thereafter, about 98 pounds of ground cheese are added to the mechanical heating apparatus. The addition of the cheese will reduce the temperature which is, however, brought up to about 150° F, and the mass is stirred until it is thoroughly mixed and melted. Seasoning can be added at this time, if desired, or, if preferred, seasoning could be added when the emulsifying agent was added. The cheese is now ready to be poured.

It is run into foil-lined containers and is sealed. It is then put into a cool place, and is subsequently ready for shipment. This process can be practiced in any factory with a great saving, for example, in boxes and bandages ordinarily required in cheese manufacturing. Further than this, there is no waste of rind, and there is no material expense due to the use of a cooler. Further, it can be put on the market very much sooner than has heretofore been possible.

It is to be particularly noted that the process is directed to the treatment of curd and it has been found that the addition of the ground cheese in the particular stage of the treatment as outlined in detail above, prevents bloating of the curd and prevents the formation of bacteria which produces gas. Curd treated in the manner outlined will keep for a great length of time without any bloating whatsoever.

It will be seen that a novel process of making cheese has been provided by this invention, which may be very rapidly carried out in a minimum time, and which may be followed without any waste whatsoever.

It will be seen further that the process is very simple and can be easily conducted in any cheese making establishment.

Although the invention has been described in considerable detail, such description is intended as illustrative rather than limiting as the invention may be variously embodied and as the scope of such invention is to be determined as claimed.

We claim:

1. The process of making curd cheese which consists in grinding standard curd into a granular or fluffy mass, adding an emulsifying agent and a liquid to emulsify the mass, thereafter heating the mixture and stirring it, thereafter adding ground cheese to the mixture and continuing the heating and stirring of the mass, and finally pouring the resulting liquid into foil-lined containers and sealing such containers.

2. The process of making curd cheese which comprises grinding approximately 100 pounds of standard curd to a fluffy mass, adding approximately 3 pounds of sodium phosphate, and 25 pounds of water, heating the mixture to approximately 160° F. until it is thoroughly melted, adding approximately 98 pounds of ground cheese and thoroughly stirring the mixture, thereafter raising the temperature to approximately 150° F. and subsequently running the liquid into foil-lined containers and sealing such containers.

In testimony that we claim the foregoing we have hereunto set our hands at Cascade, in the county of Sheboygan and State of Wisconsin.

AUGUST H. KAUFMANN.
HERMAN H. KAUFMANN.